US009062753B2

(12) United States Patent
Tamura et al.

(10) Patent No.: US 9,062,753 B2
(45) Date of Patent: Jun. 23, 2015

(54) CONNECTION STRUCTURE BETWEEN HOLLOW OUTPUT SHAFT AND DRIVEN SHAFT, AND SPEED REDUCER

(75) Inventors: Mitsuhiro Tamura, Aichi (JP); Masayuki Ishizuka, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/601,173

(22) Filed: Aug. 31, 2012

(65) Prior Publication Data

US 2013/0058709 A1    Mar. 7, 2013

Related U.S. Application Data

(63) Continuation of application No. PCT/JP2011/051857, filed on Jan. 31, 2011.

(30) Foreign Application Priority Data

Mar. 1, 2010    (JP) ................. 2010-044585

(51) Int. Cl.
*F16D 1/00*    (2006.01)
*F16H 57/04*    (2010.01)
(Continued)

(52) U.S. Cl.
CPC ......... *F16H 57/043* (2013.01); *Y10T 403/7018* (2015.01); *Y10T 403/70* (2015.01);
(Continued)

(58) Field of Classification Search
CPC ....... F16H 37/00; F16H 35/00; F16H 3/0915; F16H 48/08; F16H 57/043; F16H 57/0483; F16H 57/0495; F16H 1/06; F16H 1/10; F16H 1/14; F16H 2057/02073; F16H 2210/12; F16H 7/00; F16H 2300/06; F16H 1/0876

USPC ........ 74/416, 417, 606 R, 606 A, 413, 421 R, 74/423, 467; 384/585; 403/355, 356, 403/359.6, 40; 464/7, 11, 16
See application file for complete search history.

(56) References Cited

U.S. PATENT DOCUMENTS 292,994 A  * 2/1884  Darling .......................... 403/40
2,072,090 A  * 3/1937  Anderson ..................... 464/162
(Continued)

FOREIGN PATENT DOCUMENTS

JP    S63154867 U    10/1988
JP    2-66723 U    5/1990
(Continued)

OTHER PUBLICATIONS

International Search Report dated Apr. 19, 2011 corresponding to International Patent Application No. PCT/JP2011/051857 and English translation thereof.
(Continued)

*Primary Examiner* — William Kelleher
*Assistant Examiner* — Valentin Craciun
(74) *Attorney, Agent, or Firm* — Squire Patton Boggs (US) LLP (57) ABSTRACT

There is provided a connection structure between a hollow output shaft of a speed reducer, which is provided with the hollow output shaft including a hollow portion, and a driven shaft of a counterpart machine inserted into the hollow portion of the hollow output shaft. The connection structure includes a communication passage through which the hollow portion of the hollow output shaft communicates with an internal space of the speed reducer. A space, which includes clearance between the hollow output shaft and the driven shaft, is formed as a closed space.

9 Claims, 5 Drawing Sheets

(51) Int. Cl.
*F16D 1/08* (2006.01)
*F16H 1/14* (2006.01)

(52) U.S. Cl.
CPC ............... *Y10T 403/52* (2015.01); *F16H 1/14* (2013.01); *F16H 57/0495* (2013.01); *F16D 1/0876* (2013.01); *F16D 2300/06* (2013.01)

(56) References Cited

U.S. PATENT DOCUMENTS

| | | | | |
|---|---|---|---|---|
| 2,090,066 | A | * | 8/1937 | Peterson .................... 464/16 |
| 2,116,290 | A | * | 5/1938 | Spicer ....................... 464/162 |
| 2,543,918 | A | * | 3/1951 | Lower ....................... 464/154 |
| 2,672,115 | A | * | 3/1954 | Conover .................... 416/129 |
| 2,841,966 | A | * | 7/1958 | Belden et al. ............... 464/154 |
| 3,133,452 | A | * | 5/1964 | Coutant et al. ............. 74/421 R |
| 3,757,535 | A | * | 9/1973 | Stein ......................... 464/16 |
| 3,802,294 | A | * | 4/1974 | Smirl ........................ 475/280 |
| 3,993,227 | A | * | 11/1976 | Oettinger .................. 222/368 |
| 4,176,564 | A | * | 12/1979 | Ahlen et al. ............... 475/48 |
| 4,232,772 | A | * | 11/1980 | Brissey et al. ............. 192/114 R |
| 4,341,296 | A | * | 7/1982 | Schaefer et al. .......... 192/113.5 |
| 4,802,783 | A | * | 2/1989 | Erikson ..................... 403/2 |
| 4,904,214 | A | * | 2/1990 | Eick .......................... 440/83 |
| 5,119,905 | A | * | 6/1992 | Murray ...................... 184/6.11 |
| 5,207,697 | A | * | 5/1993 | Carusillo et al. ............ 606/167 |
| 5,366,399 | A | * | 11/1994 | Reid et al. .................. 440/83 |
| 5,375,479 | A | * | 12/1994 | Kouno et al. ............... 74/420 |
| 5,437,338 | A | * | 8/1995 | Martin et al. ............... 173/47 |
| 5,857,913 | A | * | 1/1999 | Fujimura et al. ............ 464/36 |
| 6,098,753 | A | * | 8/2000 | Lamarre et al. ............. 184/6.11 |
| 7,832,189 | B1 | * | 11/2010 | Ehrhart et al. .............. 56/13.6 |
| 8,356,695 | B2 | * | 1/2013 | Scuffham et al. ........... 184/6.12 |
| 8,371,186 | B2 | * | 2/2013 | Tamura et al. .............. 74/417 |
| 2004/0129101 | A1 | * | 7/2004 | Mineshima .................. 74/423 |
| 2005/0199201 | A1 | * | 9/2005 | Schafer et al. .............. 123/90.17 |
| 2008/0308054 | A1 | * | 12/2008 | Kohrs et al. ................. 123/90.17 |
| 2009/0038570 | A1 | * | 2/2009 | Schafer et al. .............. 123/90.17 |
| 2009/0165581 | A1 | * | 7/2009 | Koyagi et al. ............... 74/89.23 |
| 2009/0169343 | A1 | * | 7/2009 | Tange ......................... 414/217 |
| 2010/0080498 | A1 | * | 4/2010 | Tamura et al. .............. 384/585 |
| 2010/0086248 | A1 | * | 4/2010 | Yamamoto et al. ......... 384/548 |
| 2010/0292040 | A1 | * | 11/2010 | Yamamoto et al. ......... 475/178 |
| 2013/0058709 | A1 | * | 3/2013 | Tamura et al. .............. 403/288 |

FOREIGN PATENT DOCUMENTS

| | | | | |
|---|---|---|---|---|
| JP | 03-244859 A | | 10/1991 | |
| JP | 2003-113908 A | | 4/2003 | |
| JP | 2004121989 A | * | 4/2004 | ............... C02F 1/04 |
| JP | 2006-200747 A | | 8/2006 | |
| JP | 2007078033 A | | 3/2007 | |

OTHER PUBLICATIONS

International Search Report application No. PCT/JP2011/051857 dated Sep. 20, 2012.
JP Office Action for JP Application No. 2010-044585, dated Apr. 2, 2013.

\* cited by examiner

PRIOR ART

CONNECTION STRUCTURE BETWEEN HOLLOW OUTPUT SHAFT AND DRIVEN SHAFT, AND SPEED REDUCER

CROSS REFERENCE TO RELATED APPLICATION

This is a Continuation of International Patent Application No. PCT/JP2011/051857 filed Jan. 31, 2011, which designates the U.S. and was published under PCT Article 21(2) in English, and which claims priority from Japanese Patent Application No. 2010-044585, dated Mar. 1, 2010. The contents of these applications are hereby incorporated by reference.

TECHNICAL FIELD

The present invention relates to a connection structure between a hollow output shaft and a driven shaft inserted into a hollow portion of the hollow output shaft, and a speed reducer optimum for the achievement of the connection structure.

DESCRIPTION OF THE RELATED ART

Figure 5:
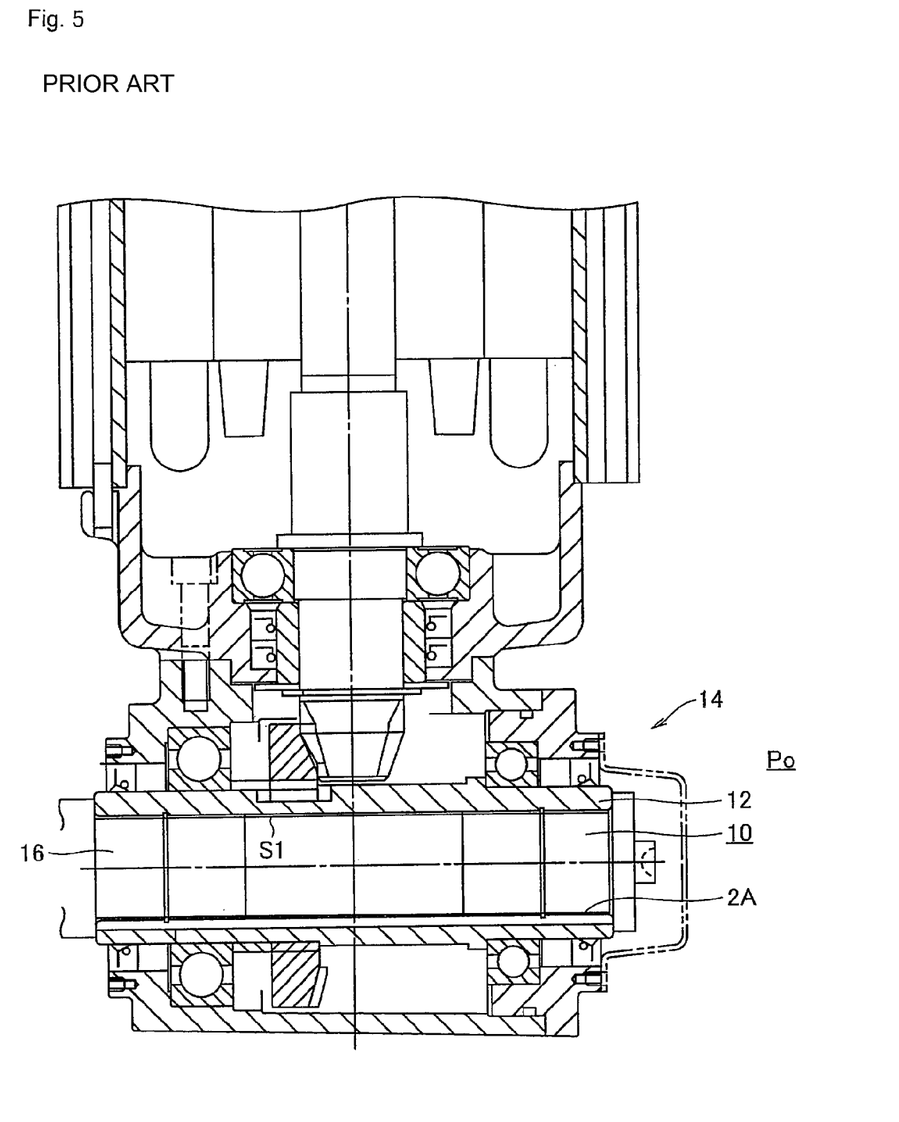
FIG. 5 is a cross-sectional view showing an example a connection structure between a hollow output shaft and a driven shaft in the related art.

In the past, a speed reducer 14, which is provided with a hollow output shaft 12 including a hollow portion 10 as shown in FIG. 5. A speed reducer 14 is used while a driven shaft 16 is directly inserted into the hollow portion 10 of the hollow output shaft 12.

The inner diameter of the hollow output shaft 12 is set to be slightly larger than the outer diameter of the driven shaft 16 (clearance-fit), and the hollow output shaft 12 is connected to the driven shaft 16 so that power can be transmitted by a key (not shown).

SUMMARY

According to an embodiment of the present invention, there is provided a connection structure having a hollow output shaft of a speed reducer, which is provided with the hollow output shaft including a hollow portion, a driven shaft of a counterpart machine inserted into the hollow portion of the hollow output shaft, and a communication passage through which the hollow portion of the hollow output shaft communicates with an internal space of the speed reducer. A space, which includes clearance between the hollow output shaft and the driven shaft, is formed as a closed space.

DESCRIPTION OF EMBODIMENTS

Connection based on the "clearance-fit" has a merit in that the hollow output shaft 12 and the driven shaft 16 can be easily and reliably connected to each other at room temperature, but has a problem in that so-called "fretting" easily occurs between the hollow output shaft 12 and the driven shaft 16 or between the key and these shafts. Fretting is a phenomenon where relative slight slip repeatedly occurs between the hollow output shaft 12 and the driven shaft 16 (or between the key and these shafts) due to vibration or the like and surface damage occurs.

It is said that lubricating a contact portion between members is effective as measure against fretting. However, when the hollow output shaft of a speed reducer is connected to the driven shaft, clearance S1 between the inner periphery of the hollow output shaft 12 and the outer periphery of the driven shaft 16 naturally communicates with an external space Po. Accordingly, the lubrication of the clearance S1 cannot but be performed with grease (which does not flow out), and is actually performed with grease in the related art.

However, in order to prevent fretting between the hollow output shaft of the speed reducer and the driven shaft by lubrication performed with grease, maintenance for disassembling the hollow output shaft and the driven shaft at a short interval during which fretting is unlikely to occur, wiping degraded grease off to perform maintenance, applying new grease, and reassembling the hollow output shaft with the driven shaft, should be actually performed at regular intervals.

For this reason, a lot of time, effort, and cost are actually required due to this maintenance.

The embodiment of the invention has been made to solve the above-mentioned problems, and an object of the embodiment of the invention is to provide a connection structure between a hollow output shaft and a driven shaft that can effectively prevent fretting from occurring between the hollow output shaft and the driven shaft and reduce the frequency of maintenance requiring effort, time, and cost (which may be omitted in some cases).

In the embodiment of the invention, through the fundamental re-examination of the concept of lubrication, the lubrication of the clearance is performed using "a lubricant (a lubricating agent having high flowability)". Specifically, the connection structure includes "communication passages" through which the hollow portion of the hollow output shaft communicates with an internal space of the speed reducer, and a lubricant, which is present in the speed reducer, is supplied to the clearance through the communication passages. In addition, a space, which includes the clearance between the hollow output shaft and the driven shaft, is formed as a closed space. Accordingly, while connecting the hollow output shaft to the driven shaft, it is possible to lubricate the clearance with a lubricant contained in the speed reducer and to prevent the lubricant from flowing to the outside through the clearance.

As a result, apart of a lot of the lubricant contained in the speed reducer is supplied to the clearance between the hollow output shaft and the driven shaft, so that fretting is effectively prevented.

Meanwhile, according to the embodiment of the invention, it is possible to provide a speed reducer which is provided with a hollow output shaft including a hollow portion and in which a driven shaft of a counterpart machine is inserted into the hollow portion. The speed reducer includes communication passages through which the hollow portion of the hollow output shaft communicates with an internal space of the speed reducer.

According to the embodiment of the invention, it is possible to effectively prevent fretting from occurring between a hollow output shaft of a speed reducer and a driven shaft and to reduce the frequency of, or omit, the maintenance of a connecting portion that requires effort, time, and cost.

An example of an embodiment of the invention will be described in detail below with reference to the drawings.

Figure 1:
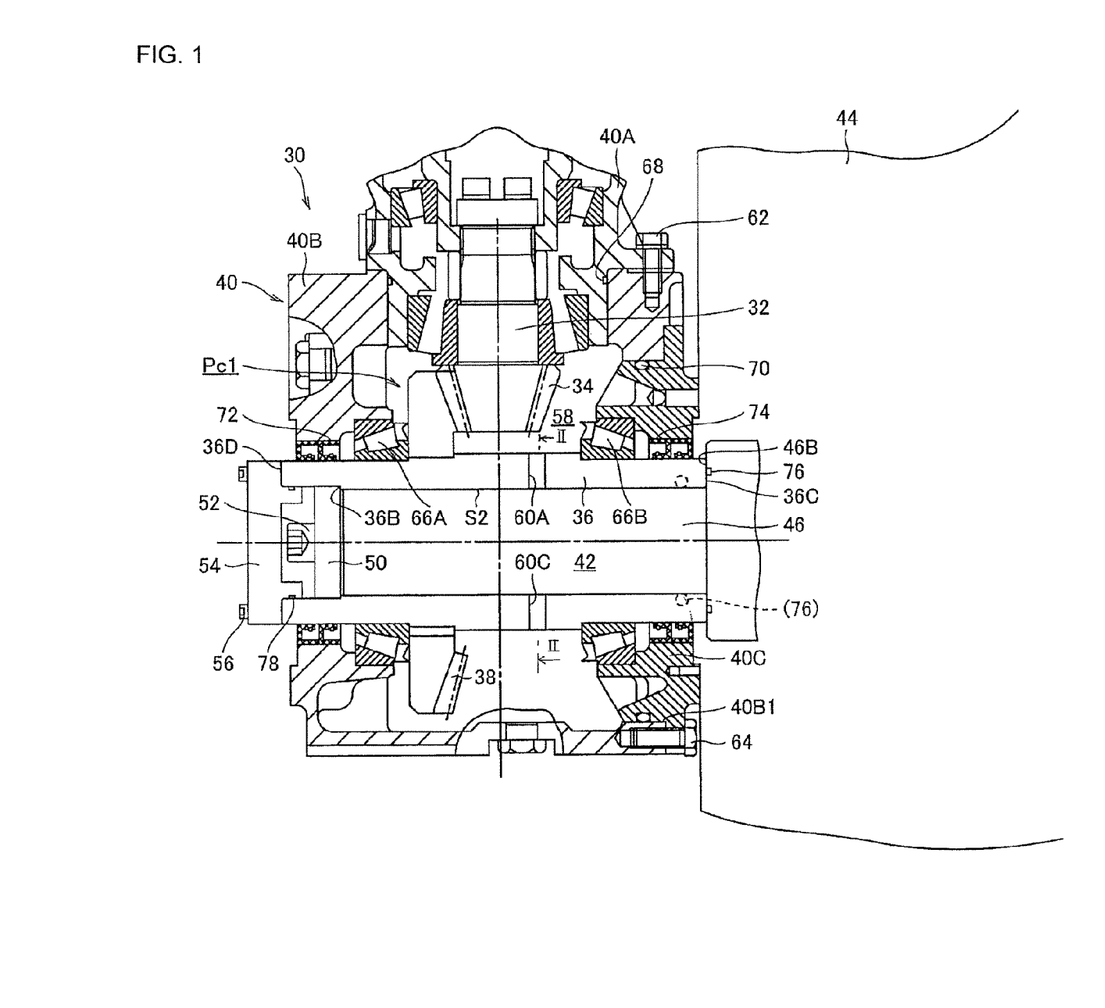
FIG. 1 is a cross-sectional view showing a connection structure between a hollow output shaft and a driven shaft according to an example of an embodiment of the invention.
Figure 2:
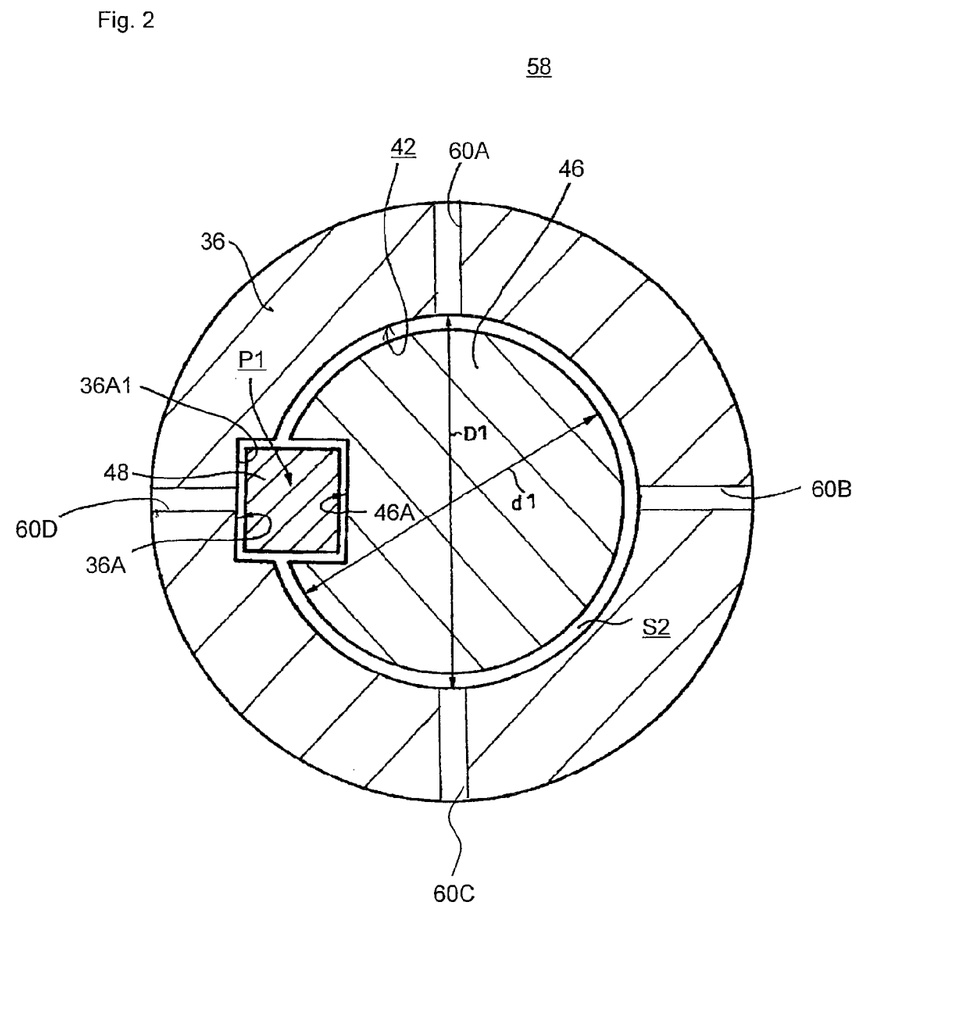
FIG. 2 is a cross-sectional view showing a connection structure between a hollow output shaft and a driven shaft according to the embodiment FIG. 1.

FIG. 1 is a cross-sectional view showing a connection structure between a hollow output shaft and a driven shaft according to an example of an embodiment of the invention, and FIG. 2 is an enlarged cross-sectional view taken along line II-II of FIG. 1.

A speed reducer 30 according to this embodiment includes a bevel pinion 34 formed on a bevel pinion shaft 32 and a bevel gear 38 fixed to a hollow output shaft 36. The rotation of a motor (not shown) is transmitted to the hollow output shaft 36 while being decelerated through the mesh between the bevel pinion 34 and the bevel gear 38.

The hollow output shaft 36 passes through a casing 40 of the speed reducer 30 and includes a hollow portion 42 that passes through the hollow output shaft 36. A driven shaft 46 of a counterpart machine 44 is inserted into the hollow portion 42. Here, the "counterpart machine" is a machine that is driven by the rotation of the hollow output shaft 36 of the speed reducer 30 of such as a carrying conveyor or an industrial machine tool, and the "driven shaft" is a shaft that is directly rotated by the hollow output shaft 36, that is, an input shaft of the counterpart machine.

As schematically shown in FIG. 2, an inner diameter D1 of the hollow output shaft 36 is slightly larger than an outer diameter dl of the driven shaft 46 and both the shafts 36 and are engaged with each other with clearance S2 (by clearance-fit). Keyways 36A and 46A are formed on the hollow output shaft 36 and the driven shaft 46, respectively. Since a key 48 is fitted to a space P1 that is formed by the keyways 36A and 46A, the hollow output shaft 36 and the driven shaft 46 are connected to each other so that power can be transmitted by the key 48.

A plurality of communication passages 60 (four communication passages 60A to 60D in this example), through which the hollow portion 42 of the hollow output shaft 36 communicates with an internal space 58 of the speed reducer 30, are formed in the hollow output shaft 36. One communication passage 60D of the communication passages 60 is opened to a bottom 36A1 of the keyway 36A of the hollow output shaft 36 so that the hollow portion 42 of the hollow output shaft 36 communicates with the internal space 58 of the speed reducer 30.

Returning to FIG. 1, the positioning (fixing) of the hollow output shaft 36 and the driven shaft 46 in an axial direction is performed by a positioning plate 50 that is disposed at a stepped portion 36B of the hollow output shaft 36 and a bolt 52 that passes through the positioning plate 50 and is screwed into the driven shaft 46. When the bolt 52 is screwed, a stepped portion 46B of the driven shaft 46 comes into contact with an end portion 36C of the hollow output shaft 36 facing the counterpart machine. Accordingly, the position of the driven shaft 46 in the axial direction is fixed. Meanwhile, a cover plate 54 is attached and fixed to an end portion 36D of the hollow output shaft 36, which is opposite to the counterpart machine, by a bolt 56.

A space, which includes the clearance S2 between the hollow output shaft 36 and the driven shaft 46, is a common space Pct and the entire space is formed as a closed space. A specific structure, which makes this common space Pct be formed of a closed space, will be described below.

The casing 40 of the speed reducer 30 mainly includes an input-side casing 40A that supports the bevel pinion shaft 32 so as to allow the bevel pinion shaft 32 to be rotatable, a main body casing 40B that covers substantially the entire hollow output shaft 36, and a counter-side casing 40C that closes an opening 40B1 of the main body casing 40B facing the counterpart machine. The input-side casing 40A is fixed to and integrated into the main body casing 40B by bolts 62. The counter-side casing 40C is fixed to and integrated into the main body casing 40B by bolts 64. Both ends of the hollow output shaft 36 are supported by a pair of tapered roller bearings 66A and 66B that are assembled with the main body casing 40B and the counter-side casing 40C, respectively.

Here, a first O-ring (seal member) 68 is disposed between the input-side casing 40A and the main body casing 40B. A second O-ring 70 is disposed between the main body casing 40B and the counter-side casing 40C. Two first oil seals (seal members) 72 are disposed in parallel on the side of the tapered roller bearing 66A, which is opposite to the counterpart machine in the axial direction, between the main body casing 40B and the hollow output shaft 36. Two second oil seals (seal members) 74 are disposed in parallel on the side of the tapered roller bearing 66B, which faces the counterpart machine in the axial direction, between the counter-side casing 40C and the hollow output shaft 36.

Further, the stepped portion 46B of the driven shaft 46 comes into contact with an end face 36C of the hollow output shaft 36 facing the counterpart machine and a third O-ring 76 is disposed between the end face 36C and the stepped portion 46B. Meanwhile, the third O-ring 76 may be provided between the inner periphery of the hollow output shaft 36 and the outer periphery of the driven shaft 46 (for example, at a position indicated by a broken line and 76 in parenthesis in FIG. 1). A fourth O-ring 78 is disposed on the side of the hollow output shaft 36, which is opposite to the counterpart machine, between the cover plate 54 and the hollow output shaft 36.

Eventually, "the common space Pc1 including the clearance S2 between the hollow output shaft 36 and the driven shaft 46" forms a closed space (a space that is closed from the external space of the speed reducer and the internal space of the counterpart machine) as a whole by the above-mentioned structure. A lubricant contained in the speed reducer 30 can be present only in the closed common space P1 and cannot leak to the outside of the common space Pc1.

Next, the operation of the connection structure according to this embodiment will be described.

Since the communication passages 60 (60A to 60D), through which the hollow portion 42 of the hollow output shaft 36 communicates with the internal space 58 of the speed reducer 30, are formed in the hollow output shaft 36, a lubricant contained in the internal space 58 of the speed reducer 30 can enter the clearance S2 between the hollow output shaft 36 and the driven shaft 46 through the communication passages 60. Accordingly, the clearance S2 is lubricated.

In particular, since the plurality of communication passages 60 (four communication passages 60A to 60D) are formed in this embodiment, the lubricant having entered the clearance S2 easily moves (flows into and from the internal space 58). Accordingly, lubrication can be always achieved with a copious amount of lubricant contained in the speed reducer 30.

Further, since one communication passage 60D of the communication passages 60 is opened to the bottom 36A1 of the keyway 36A of the hollow output shaft 36, it is also possible to sufficiently supply a lubricant around the keyway 36A (where fretting particularly easily occurs). Accordingly, it is very difficult for fretting to occur and maintenance (to prevent fretting) peculiar to a connecting portion between the hollow output shaft 36 and the driven shaft 46 is not necessary. Therefore, when the lubricant contained in the speed reducer 30 is changed at a predetermined time, the maintenance of the connecting portion is also naturally achieved. As a result, it is possible to significantly reduce the frequency of maintenance.

Meanwhile, in this embodiment, the four communication passages 60 (60A to 60D) have been formed at the same positions of the hollow output shaft 36 in the axial direction. However, if a plurality of communication passages 60 is formed in the axial direction, it is possible to further facilitate the movement of the lubricant in the clearance S2. Moreover, it is possible to further facilitate the movement of the lubricant in the clearance S2, particularly, in the axial direction by making the positions (the circumferential positions and the axial positions) of the formed communication passages 60 intentionally deviate from each other.

Meanwhile, the input-side casing 40A, the main body casing 40B, and the counter-side casing 40C, which form the casing 40 of the speed reducer 30, are sealed to each other by the first and second O-rings 68 and 70, so that the leakage of the lubricant from the common space Pc1 is prevented. A gap between the main body casing 40B and the hollow output shaft 36 and a gap between the counter-side casing 40C and the hollow output shaft 36 are sealed by the two first oil seals 72 and the two second oil seals 74, respectively.

Further, since the stepped portion 46B of the driven shaft 46 comes into contact with the end face 36C of the hollow output shaft 36 in this embodiment, the third O-ring 76 is disposed between the end face 36C of the hollow output shaft 36 facing the counterpart machine and the stepped portion 46B of the driven shaft 46. Furthermore, the fourth O-ring 78 is disposed between the hollow output shaft 36 and the cover plate 54 at the end portion of the hollow output shaft 36 opposite to the counterpart machine.

For this reason, since the common space Pc1 including the clearance S2 between the hollow output shaft 36 and the driven shaft 46 forms a completely closed space (a hermetically-sealed space), the lubricant having entered the clearance S2 between the hollow output shaft 36 and the driven shaft 46 does not leak to the outside (the outside of the speed reducer 30 or the inside of the counterpart machine 44).

Accordingly, the driven shaft 46 of the counterpart machine 44 is inserted into the hollow portion 42 of the hollow output shaft 36 of the speed reducer 30 with the clearance S2, and it is possible to sufficiently lubricate the clearance S2 between the hollow output shaft 36 and the driven shaft 46 in addition to the vicinity of the key 48 by using the lubricant contained in the speed reducer 30. Therefore, it is possible to prevent fretting from occurring.

Figure 3:
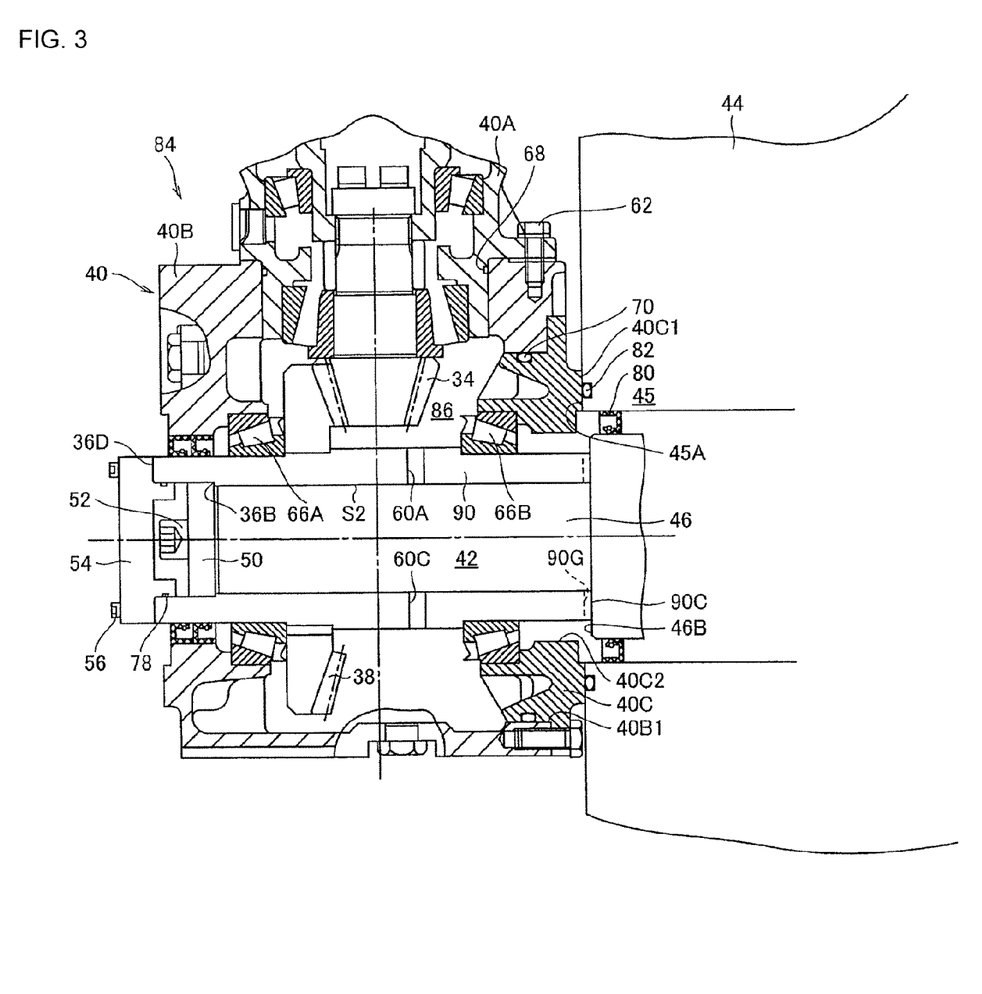
FIG. 3 is a cross-sectional view showing a connection structure between a hollow output shaft and a driven shaft according to an example of still another embodiment of the invention.

An example of another embodiment is shown in FIG. 3.

In a second embodiment shown in FIG. 3, a third oil seal 80 is disposed between the counterpart machine 44 and (a stepped portion portion 46A) of a driven shaft 46. Further, the fifth O-ring 82 is disposed between a counter-side end face 40C1 of a counter-side casing 40C and an end face 45A of a casing 45 of the counterpart machine 44 facing a speed reducer.

In this second embodiment, an internal space 86 of a speed reducer 84 is partially expanded to the counterpart machine 44 beyond a through hole 40C2 of the counter-side casing 40C of the speed reducer 84. A space, which is continuously expanded to the outside of the casing in appearance as described above, is also included in the "internal space of the speed reducer" of the invention.

An end portion 90C of a hollow output shaft 90 facing the counterpart machine 44 and a stepped portion 46B of the driven shaft 46 come into contact with each other but are not sealed to each other. On the contrary, a plurality of grooves 90G are positively formed on the end portion 90C of the hollow output shaft 90 in a radial direction, and the grooves 90G function as "communication passages". A lubricant can enter clearance S2 between the hollow output shaft 90 and the driven shaft 46 from the internal space 86 of the speed reducer 84 through the grooves 90G (as the communication passages) that are formed on the end portion 90C of the hollow output shaft 90.

For this reason, particularly, it is possible to sufficiently spread a lubricating agent to the vicinity of an end portion of the hollow output shaft 90 facing the counterpart machine and to more easily prevent fretting (as compared to the previous first embodiment where the communication passages 60 have been formed only in the middle of the hollow output shaft in the axial direction).

Since other structures are the same as those of the previous embodiment, the same portions as or portions similar to the portions of the previous embodiment are denoted by the same reference numerals and the repeated description thereof will be omitted.

Figure 4:
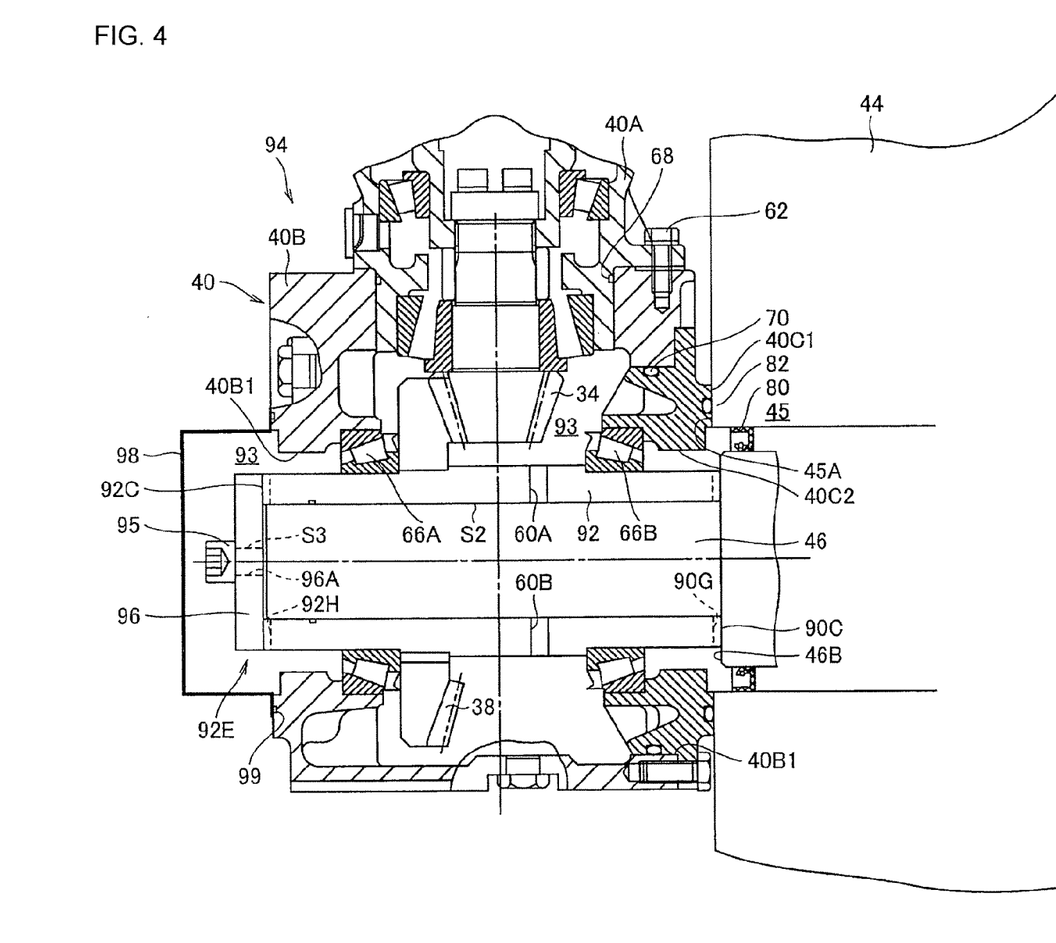
FIG. 4 is a cross-sectional view showing a connection structure between a hollow output shaft and a driven shaft according to an example of yet another embodiment of the invention.

Yet another embodiment is shown in FIG. 4.

A third embodiment shown in FIG. 4 is different from the previous two embodiments in terms of a method of closing a portion of clearance S2, which is formed between a hollow output shaft 92 and a driven shaft 46, opposite to the counterpart machine. That is, a plate 96, which covers an end portion 92E of the hollow output shaft 92, is provided on the side of a casing 40 opposite to the counterpart machine. This plate 96 has a function of the positioning plates 50 of the first and second embodiments. That is, the positioning (fixing) of the hollow output shaft 92 and the driven shaft 46 in an axial direction is performed by the plate 96 and a bolt 95 that passes through the positioning plate 96 and is screwed into the driven shaft 46.

Here, a cover 98, which covers the end portion 92E of the hollow output shaft 92, is provided on the side of the case 40 opposite to the counterpart machine. Further, a seventh O-ring (seal member) 99 is disposed between the cover 98 and the casing 40 (main body casing 40C). In this structure, an internal space 93 of a speed reducer 94 is continuously expanded on the side of the casing 40 opposite to the counterpart machine beyond a through hole 40B1 of a main body casing 40B of the speed reducer 94. A lubricant of the speed reducer 94 can enter the clearance S2, which is formed between the hollow output shaft 92 and the driven shaft 46, through clearance S3 that is formed between a bolt hole 96A of the plate and a bolt 95. That is, in this embodiment, the bolt hole 96A of the plate 96 functions as a "communication passage".

Meanwhile, in this embodiment, a groove 92H is formed in a radial direction on an end face 92C of the hollow output shaft 92 and this groove 92H also functions as the "communication passage" according to the invention.

According to the third embodiment, particularly, it is possible to more effectively prevent fretting near the end portion of the hollow output shaft 92 opposite to the counterpart machine as compared to the previous second embodiment. As a result, it is possible to obtain an excellent lubricating action over the entire region of the hollow output shaft 92 in the axial direction, so that it is possible to substantially completely prevent fretting.

Since other structures of this third embodiment are the same as those of the second embodiment shown in FIG. 3, the same portions as or portions similar to the portions of the embodiment shown in FIG. 3 are denoted by the same reference numerals and the repeated description thereof will be omitted.

Meanwhile, examples where the hollow output shaft and the driven shaft are connected to each other by a "key" has been described in the above-mentioned embodiments. However, the connection between the hollow output shaft and the driven shaft in the invention may be applied to every connection having clearance. As the connection having other clearance, there are, for example, spline connection that bears a higher load, so-called D-cut connection (connection where the cross-sections of the hollow output shaft and the driven shaft have the shape of alphabet "D") known as a simpler structure, and the like.

Further, even when a hollow output shaft and a driven shaft are to be connected to each other by the key, keyways are formed in both the hollow output shaft and the driven shaft and a key to be engaged is fitted to the respective keyways (by clearance-fit) in the above-mentioned embodiment. However, for example, a key may be formed integrally with any one shaft of a hollow output shaft and a driven shaft and the key formed integrally with the one shaft may be fitted to a keyway of the other shaft. In this case, as for the integration between the one shaft and the key, the one shaft and the key may be integrally formed or cut as one member from the beginning and two members may be integrated without clearance by shrink-fit, press-fit, or the like. When a key is integrated with the hollow output shaft, it is often the case that manufacture is easy in the case of a method of separately forming a key. Meanwhile, a structure where the communication passage is opened to the bottom of a keyway is effective in any of these cases. When a keyway is present only on the hollow output shaft (when a key is integrated with the driven shaft), the communication passage may be formed so as to be opened to the bottom of the keyway of the hollow output shaft as in the previous embodiments. In contrast, when a keyway is present only on the driven shaft (when a key is integrated with the hollow output shaft), the communication passage may be formed so as to be opened to the bottom of the keyway of the driven shaft after the key integrated with the hollow output shaft passes through the communication passage. As described above, in a method of integrating a key with any one shaft, fretting around a key occurs only between the one shaft and the other shaft. Accordingly, it is possible to more reliably prevent fretting.

Furthermore, the "(common) space including the clearance between the hollow output shaft and the driven shaft" may be a closed space as a whole in a word as already illustrated several times, and the structure for this is not necessarily limited to the above-mentioned structure. For example, in the above-mentioned structure, the structure of FIG. 1 corresponding to the counterpart machine and the structure of FIG. 4 opposite to the counterpart machine may be combined with each other. Moreover, a structure where the side of the hollow output shaft itself opposite to the counterpart machine is closed (a structure where the hollow portion does not pass through the side of the hollow output shaft opposite to the counterpart machine) may be employed other than the above-mentioned structure. In this case, since the side of the clearance, which is formed between the hollow output shaft and the driven shaft, opposite to the counterpart machine is originally closed, a specific structure used to close the clearance is not necessary.

Further, in the above-mentioned embodiment, the groove for the O-ring has been formed on the driven shaft. However, the groove for the O-ring may be formed on any one of the members coming into contact with each other, and may be formed, for example, on the end face or inner periphery of the hollow output shaft. The seal member is not necessarily limited to only an O-ring or an oil seal. For example, a liquid packing, a solid packing, or the like may be employed as the seal member.

Furthermore, examples where the hollow output shaft passes through the casing of the speed reducer have been described in the above-mentioned embodiments. However, the hollow output shaft may not necessarily pass through the side of the casing opposite to the counterpart machine. When the hollow output shaft does not pass through the side of the casing opposite to the counterpart machine, a specific structure, which is used to close the clearance on the side opposite to the counterpart machine, is not particularly necessary (since the clearance between the hollow output shaft and the driven shaft is included in the internal space of the speed reducer as a result).

Moreover, in the invention, a method of forming the communication passages and the number of the communication passages are not limited to the above-mentioned structure examples as long as the hollow portion in the hollow output shaft communicates with the internal space of the speed reducer in a word.

The invention may be used in a connection structure between a hollow output shaft and a driven shaft inserted into a hollow portion of the hollow output shaft, or a speed reducer having the connection structure.

The entire disclosure in a specification, drawings, and claims of Japanese Patent Application No. 2010-44585, filed Mar. 1, 2010, is incorporated in this specification by reference.

REFERENCE SIGNS LIST

30: speed reducer
36: hollow output shaft
40: casing
40A: input-side casing
40B: main body casing
40C: counter-side casing
42: hollow portion
44: counterpart machine
46: driven shaft
48: key
58: internal space
60 (69A to 60D): communication passage
S2: clearance
Pc1: common space

The invention claimed is:

1. A connection structure comprising:
   a hollow output shaft of a speed reducer, which is provided with the hollow output shaft including a hollow portion,
   a driven shaft of a counterpart machine inserted into the hollow portion of the hollow output shaft, and
   a communication passage through which the hollow portion of the hollow output shaft communicates with an internal space of the speed reducer,
   wherein a space, which includes a clearance between the hollow output shaft and the driven shaft, is formed as a closed space, wherein the hollow output shaft and the driven shaft are connected to each other so that power is transmitted by a key fitted to a keyway formed on at least one shaft of the hollow output shaft and the driven shaft, wherein the communication passage is opened to the bottom of the keyway, so that the hollow portion communicates, through the communication passage, with the internal space of the speed reducer, wherein an axial end face of the hollow output shaft and a stepped portion of the driven shaft come into contact with each other, and wherein a seal member is disposed between the axial end face of the hollow output shaft and the stepped portion of the driven shaft.

2. The connection structure according to claim 1, wherein the clearance between the hollow output shaft and the driven shaft is closed from an external space of the speed reducer opposite to the counterpart machine.

3. The connection structure according to claim 2, wherein the hollow portion passes through the hollow output shaft, the hollow output shaft passes through a casing of the speed reducer, a cover, which covers an end portion of the hollow output shaft, is provided on the side of the casing opposite to the counterpart machine, and a second seal is disposed between the cover and the casing.

4. The connection structure according to claim 2, wherein the side of the hollow output shaft itself opposite to the counterpart machine is closed.

5. A speed reducer comprising:

a hollow output shaft including a hollow portion and in which a driven shaft of a counterpart machine is inserted into the hollow portion, and a communication passage through which the hollow portion of the hollow output shaft communicates with an internal space of the speed reducer, wherein the hollow output shaft and the driven shaft are connected to each other so that power is transmitted by a key fitted to a keyway formed on at least one shaft of the hollow output shaft and the driven shaft, wherein the communication passage is opened to the bottom of the keyway, so that the hollow portion communicates, through the communication passage, with the internal space of the speed reducer, wherein an axial end face of the hollow output shaft and a stepped portion of the driven shaft come into contact with each other, and wherein a seal member is disposed between the axial end face of the hollow output shaft and the stepped portion of the driven shaft.

6. The speed reducer according to claim 5, wherein the communication passage is formed in the hollow output shaft itself.

7. The speed reducer according to claim 5, wherein a groove in which an O-ring is disposed is formed in the hollow output shaft.

8. The connection structure according to claim 1, wherein a seal member is disposed between the hollow output shaft and the driven shaft.

9. The connection structure according to claim 1, wherein the hollow output shaft has a second communication passage which is opened to other than a bottom of the keyway of the hollow output shaft.

* * * * *